(12) United States Patent
Jeong et al.

(10) Patent No.: US 10,892,685 B2
(45) Date of Patent: Jan. 12, 2021

(54) POWER SUPPLY DEVICE AND IMAGE FORMING APPARATUS HAVING THE SAME

(71) Applicant: HEWLETT-PACKARD DEVELOPMENT COMPANY, L.P., Spring, TX (US)

(72) Inventors: An-sik Jeong, Hwaseong-si (KR); Hong-ki Jung, Suwon-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/325,675

(22) PCT Filed: Aug. 16, 2017

(86) PCT No.: PCT/KR2017/008869
§ 371 (c)(1),
(2) Date: Feb. 14, 2019

(87) PCT Pub. No.: WO2018/034480
PCT Pub. Date: Feb. 22, 2018

(65) Prior Publication Data
US 2019/0214915 A1 Jul. 11, 2019

(30) Foreign Application Priority Data

Aug. 16, 2016 (KR) .......................... 10-2016-0103542

(51) Int. Cl.
*H02M 3/335* (2006.01)
*H02M 1/092* (2006.01)
(Continued)

(52) U.S. Cl.
CPC .... *H02M 3/33507* (2013.01); *G03G 15/5004* (2013.01); *G03G 15/80* (2013.01);
(Continued)

(58) Field of Classification Search
CPC .. H02M 3/33507; H02M 1/092; H02M 7/068; H02M 3/33523; H02M 1/00;
(Continued)

(56) References Cited

U.S. PATENT DOCUMENTS 4,422,360 A * 12/1983 Carter ...................... G10H 3/12
84/723
7,855,471 B2 * 12/2010 Sugawara .............. G03G 15/80
307/46
(Continued)

FOREIGN PATENT DOCUMENTS

JP 2004274888 9/2004
JP 2012218348 11/2012
(Continued)

*Primary Examiner* — Adolf D Berhane
*Assistant Examiner* — Kevin H Sprenger
(74) *Attorney, Agent, or Firm* — Staas & Halsey LLP

(57) ABSTRACT

A power supply device is provided. The power supply device includes an AC/DC converter configured to convert an input AC power into a first DC power having a predetermined size, and to output the first DC power, a DC/DC converter configured to convert the first DC power into a second DC power according to an enable signal, and a switch including a soft switch connected to the first DC power at one end, and configured to, in response to the soft switch being turned on, voltage-distribute the first DC power, and to provide the voltage-distributed first DC power to the DC/DC converter as an enable signal.

15 Claims, 8 Drawing Sheets

(51) Int. Cl.
  *G03G 15/00* (2006.01)
  *H02M 1/00* (2006.01)
  *H02M 7/06* (2006.01)

(52) U.S. Cl.
  CPC .............. *H02M 1/00* (2013.01); *H02M 1/092* (2013.01); *H02M 3/33523* (2013.01); *H02M 7/068* (2013.01); *H02M 7/06* (2013.01); *H02M 2001/007* (2013.01); *H02M 2001/0032* (2013.01); *Y02B 70/10* (2013.01)

(58) Field of Classification Search
  CPC ........... H02M 7/06; H02M 2001/0032; H02M 2001/007; G03G 15/5004; G03G 15/80; Y02B 70/10
  See application file for complete search history.

(56) References Cited

U.S. PATENT DOCUMENTS

| | | | | |
|---|---|---|---|---|
| 2009/0096413 A1* | 4/2009 | Partovi | ............... | H01F 5/003 320/108 |
| 2011/0064445 A1* | 3/2011 | Yashiro | ............... | G03G 15/5004 399/88 |
| 2011/0205763 A1* | 8/2011 | Artusi | ................ | H02M 1/4225 363/21.06 |
| 2012/0025616 A1* | 2/2012 | Hock | ..................... | H02J 9/061 307/66 |
| 2013/0113292 A1* | 5/2013 | Inukai | ................... | G03G 15/80 307/82 |
| 2013/0164016 A1* | 6/2013 | Inukai | ................... | G03G 15/80 399/88 |
| 2014/0098575 A1* | 4/2014 | Whitehouse | ............. | H02J 3/36 363/21.02 |
| 2014/0268916 A1* | 9/2014 | Yee | .................. | H02M 3/33576 363/21.14 |

FOREIGN PATENT DOCUMENTS

| | | |
|---|---|---|
| JP | 2015012691 | 1/2015 |
| KR | 10-2011-0010394 | 2/2011 |

* cited by examiner

【Figure 1】
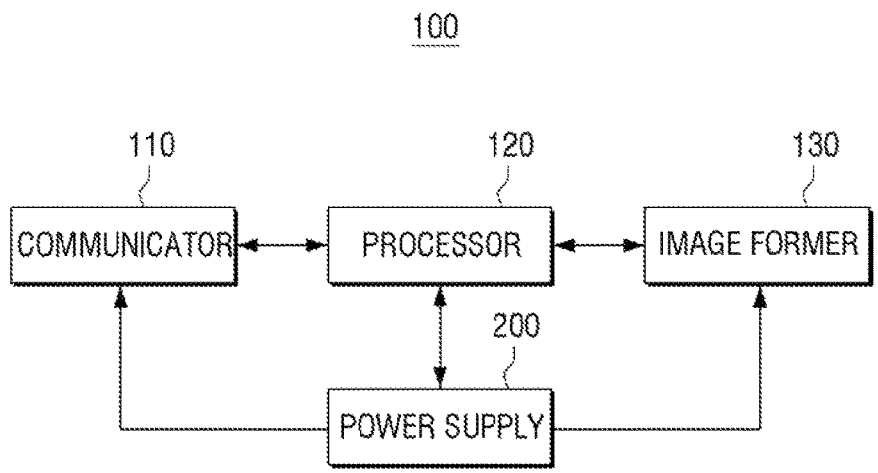
【Figure 2】
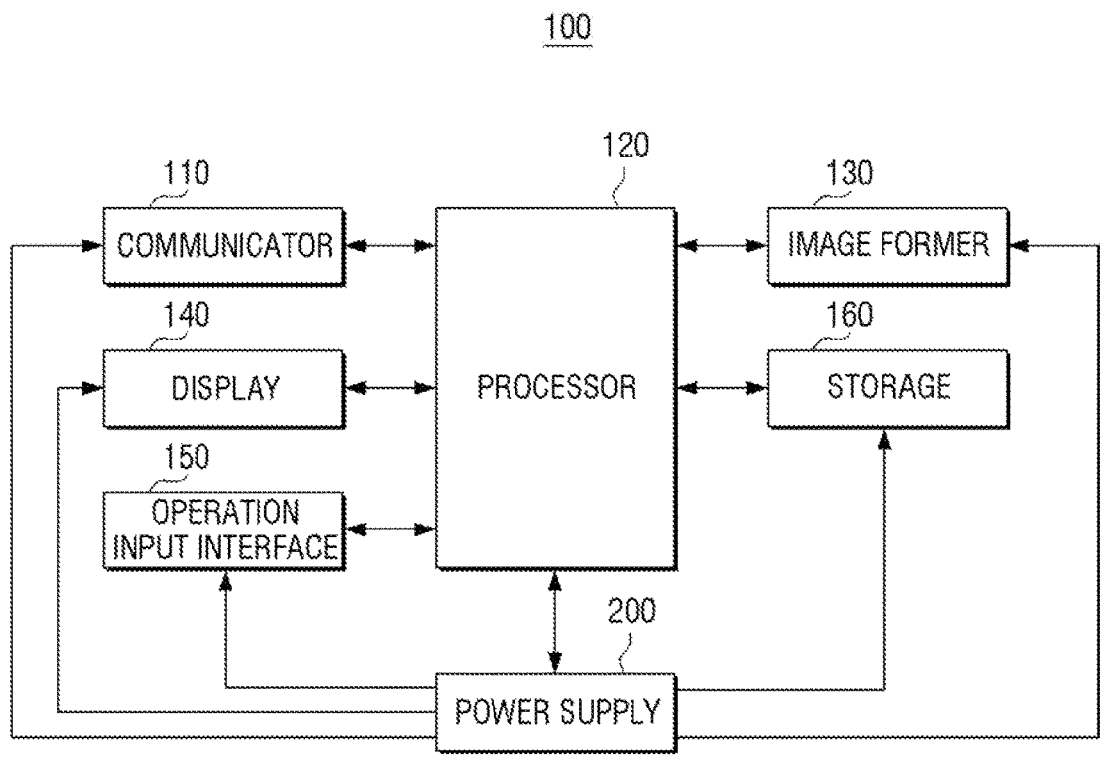

【Figure 3】
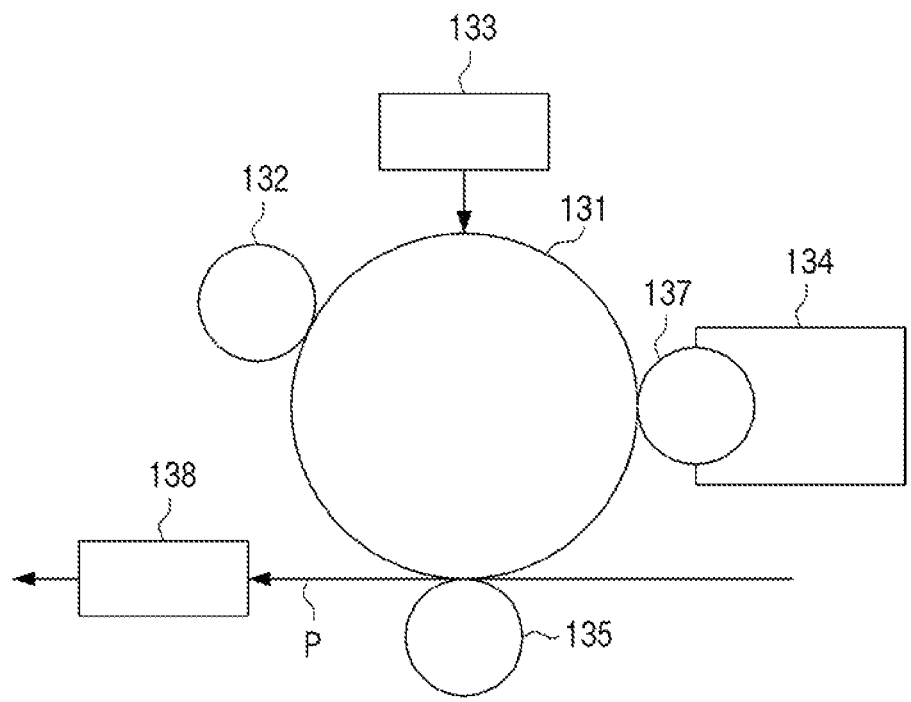
【Figure 4】
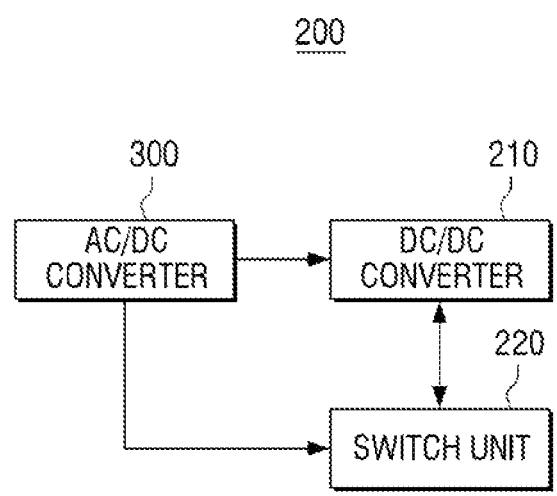

【Figure 5】
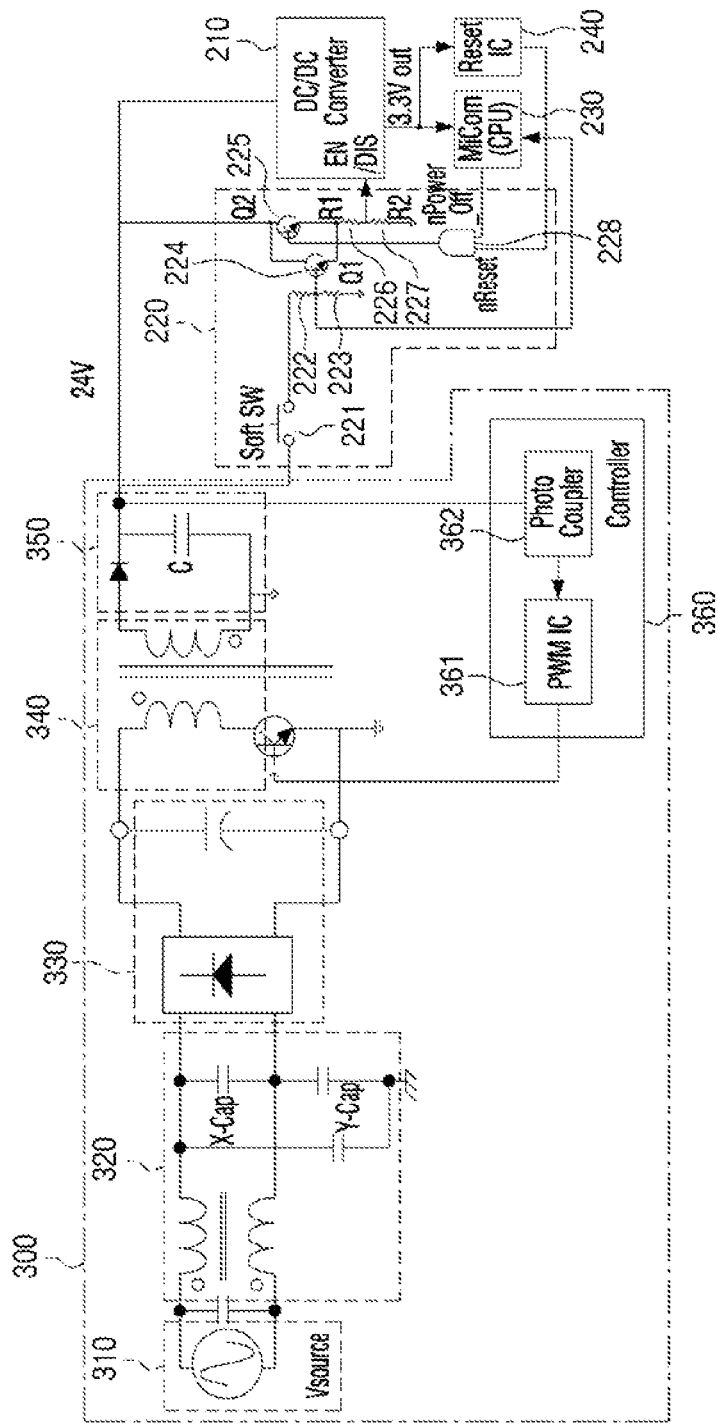

【Figure 6】
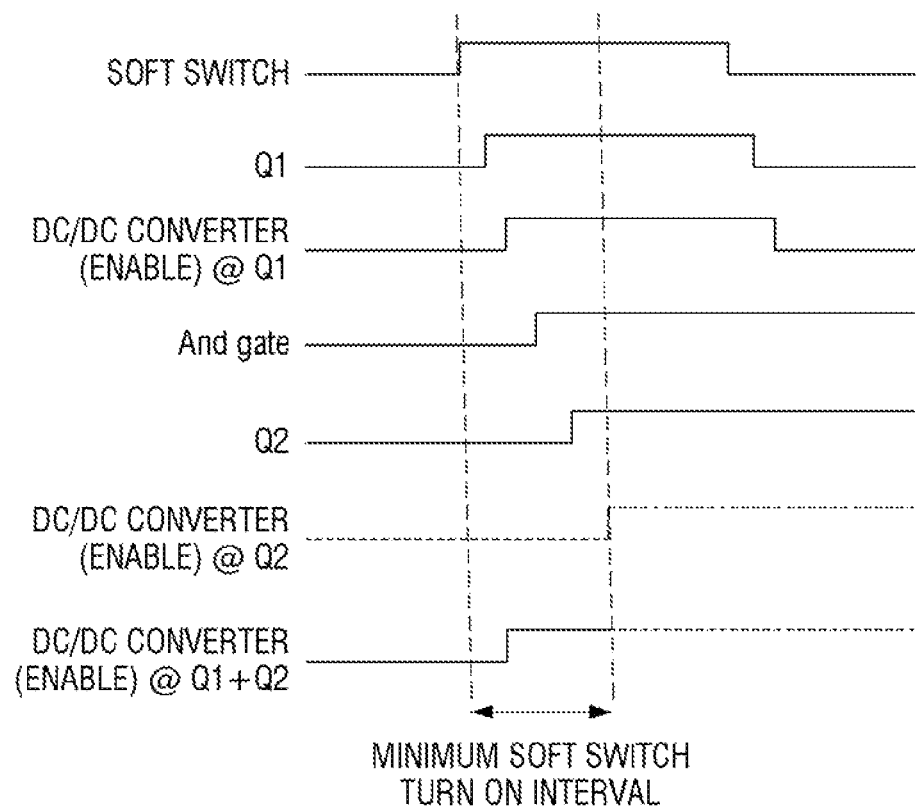

【Figure 7】
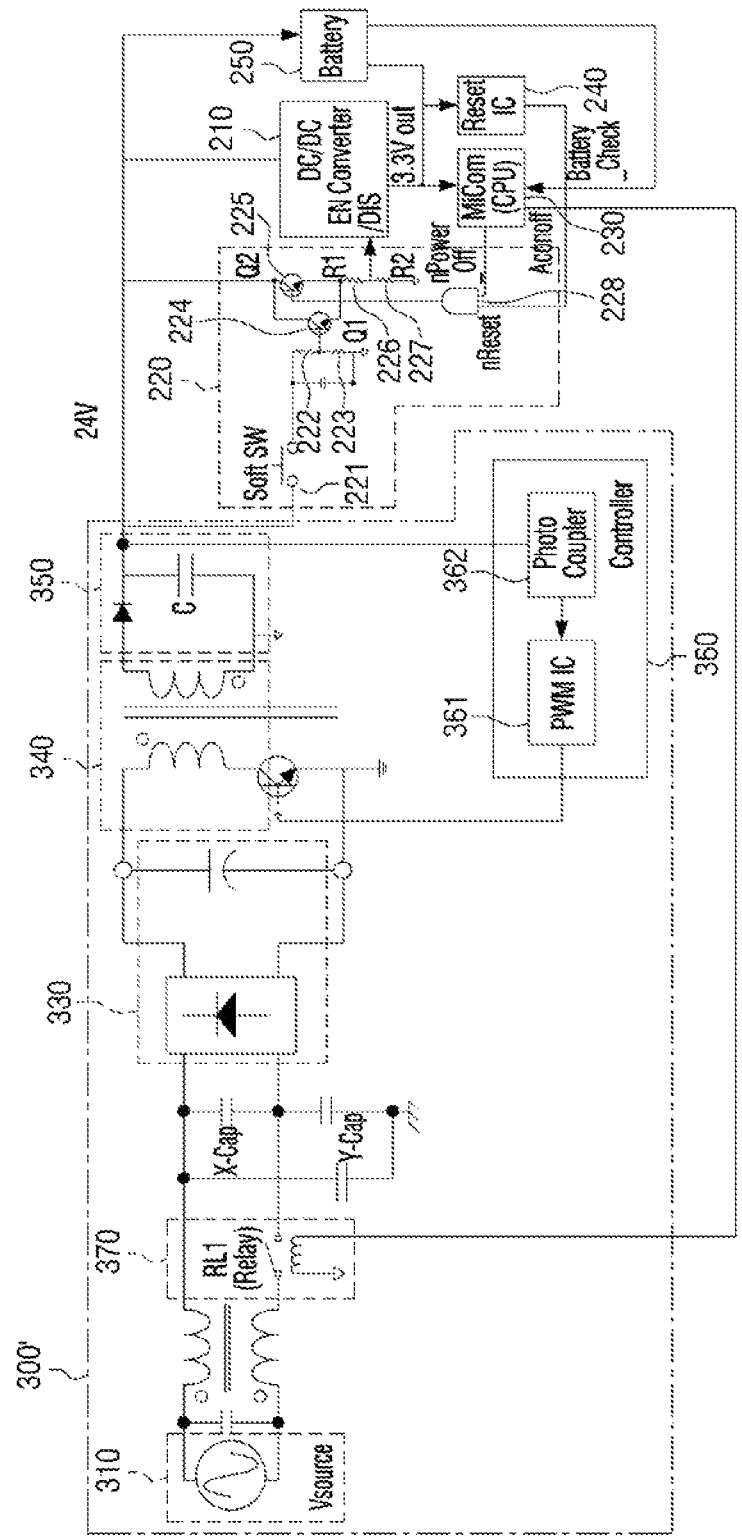

【Figure 8】
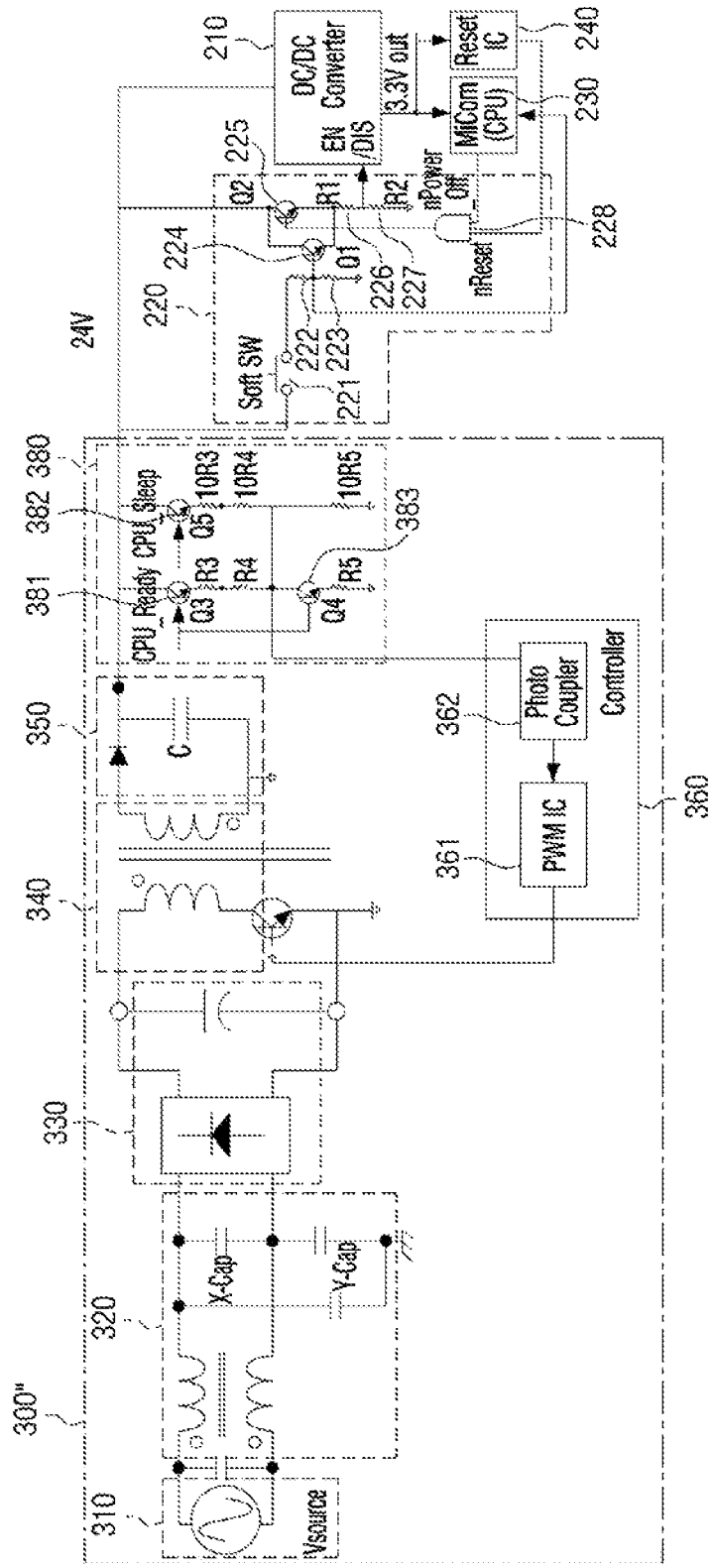

[Figure 9]
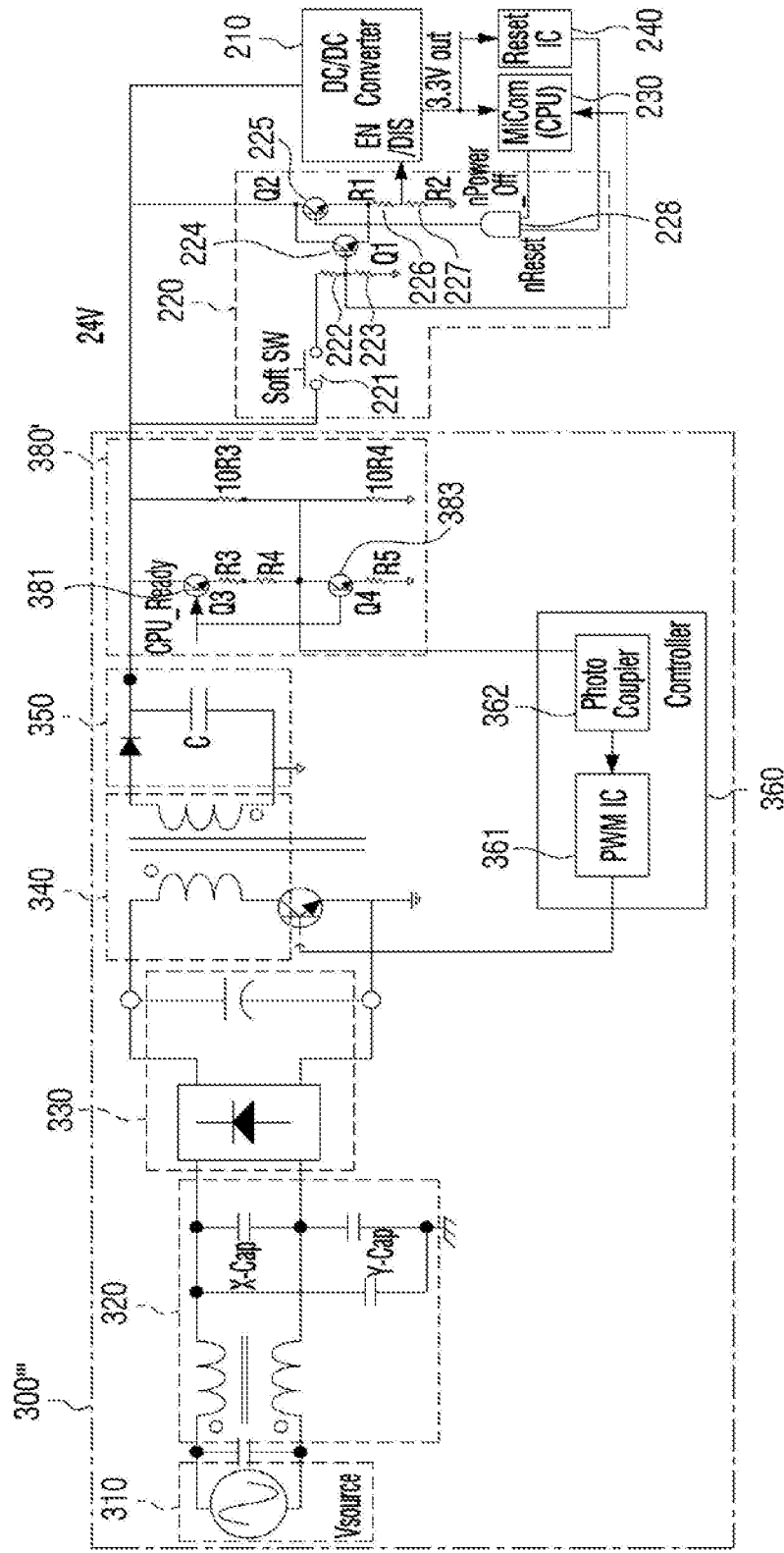

【Figure 10】
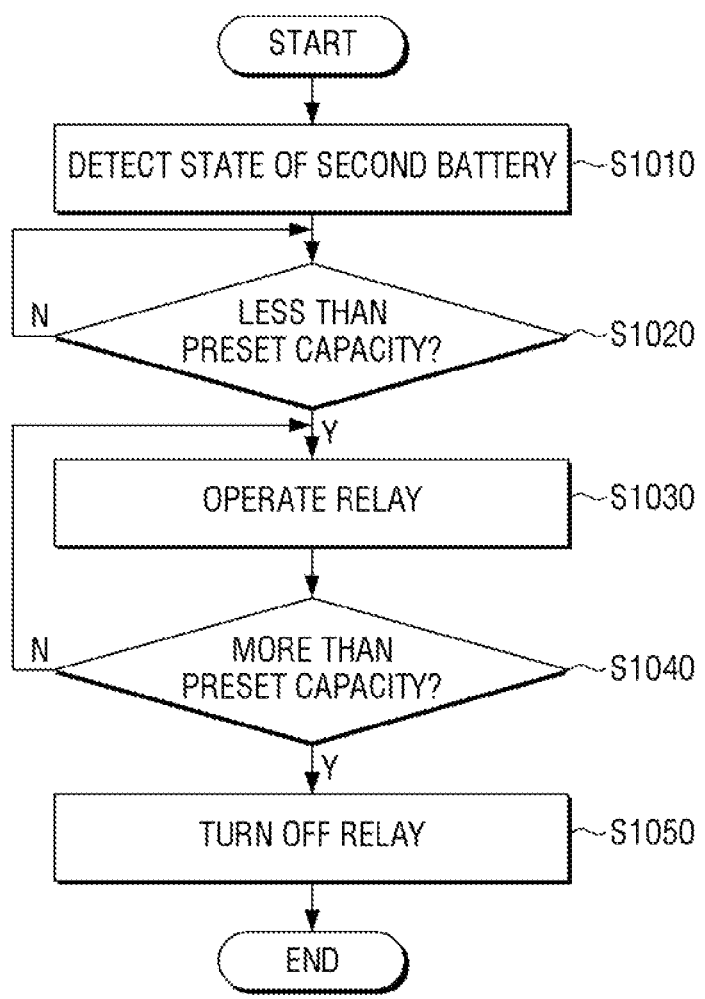

POWER SUPPLY DEVICE AND IMAGE FORMING APPARATUS HAVING THE SAME

CROSS REFERENCE TO RELATED APPLICATIONS

This application is being filed under 35 U.S.C. § 371 as a PCT national stage of PCT International Application No. PCT/KR 2017/008869 filed on Aug. 16, 2017, which claims the priority benefit of Korean Patent Application No. 10-2016-0103542 filed on Aug. 16, 2016. Both the International Application and the Korean Patent Application are incorporated by reference herein in their entirety.

TECHNICAL FIELD

Apparatuses and methods consistent with exemplary embodiments relate to a power supply device and an image forming apparatus having the same, more particularly, to a power supply device capable of reducing power consumption in a standby mode and an image forming apparatus having the same.

BACKGROUND ART

An image forming apparatus may be a printer, copy machine, facsimile, or a multifunction copy machine where functions of the printer, copy machine, and facsimile are combined.

When a printing job is not performed, the image forming apparatus is converted into a standby state and awaits a printing job command from a user to reduce power consumption.

Recently, energy reduction-related regulations have been strengthened and in particular, it has been required to maintain power consumption in the above-mentioned standby state to be less than 0.1 W.

In the related art, a soft switch which varies a voltage value of a voltage distribution circuit according to a voltage distribution circuit and a user button manipulation to receive an operation converting command from a user in a standby state; however, the detection circuit continuously consumes quite large power (approximately, 28 mW) in a circuit distribution circuit and such power consumption has had a high proportion of achieving power consumption of 0.1 W in a standby mode.

To address such problem, it has been implemented in the related art that a mechanical switch is used such that there is no power consumption in an image forming apparatus in a standby mode. However, the mechanical switch has a high unit cost, and a user has to directly turn on the mechanical switch when a printing job is to be performed, which is convenient.

Accordingly, there is a demand for a soft switch with low power consumption.

DISCLOSURE

Technical Problem

An aspect of one or more embodiments of the present disclosure is a resolution of such aforementioned problems, that is, to provide a power supply device capable of reducing power consumption in a standby state, and an image forming apparatus having the same.

Technical Solution

The power supply device includes an AC/DC converter configured to convert an input AC power into a first DC power having a predetermined size, and to output the first DC power, a DC/DC converter configured to convert the first DC power into a second DC power according to an enable signal, and a switch unit including a soft switch unit connected to the first DC power at one end, and configured to, in response to the soft switch being turned on, voltage-distribute the first DC power, and to provide the voltage-distributed first DC power to the DC/DC converter as an enable signal.

The switch may, even if the soft switch is turned off after the enable signal is provided, maintain the enable signal and provide the enable signal to the DC/DC converter.

The switch unit may include a soft switch connected to the first DC power at one end and configured to selectively output the first DC power according to a user manipulation, a resistor part including a first resistor and a second resistor connected in series, a first switch configured to selectively provide the first DC power to the resistor part according to an operation of the soft switch, a second switch configured to selectively provide the first DC power to the resistor part according to a control signal, and an AND logical device configured to receive a first control signal and a second control signal, and to provide a logical multiplier of the first control signal and the second control signal to the second switch, wherein intermediate nodes of the first resistor and the second resistor may be connected to an enable signal input of the DC/DC converter.

The soft switch may be a normal closed type of push switch which is turned on only when a user push is received.

The first switch may be a first transistor which includes a collector connected to the first DC power, a base connected to another end of the soft switch via resistance, and an emitter connected to one end of the first resistance, and the second switch may be a second transistor which includes a collector connected to the first DC power, a base connected to an output of the AND logical device, and an emitter connected to one end of the first resistance.

The power supply device may further include a micom configured to operate using the second DC power, and to output a first control signal corresponding to an operation state of the apparatus, and a resetting unit configured to operate using the second DC power, and to, in response to receiving the DC power, output a reset signal to a second control signal.

The micom may determine an operation state of the apparatus, and in response to the determined operation state being a standby state, output a first control signal of a low value.

The power supply device may further include a second battery unit configured to supply a charged power to the micom, the resetting unit and the soft switch.

The micom may control the AC/DC converter to selectively output a first DC power according to a power charging state of the second battery unit.

The AC/DC converter may include an input unit configured to receive an AC power, an AC filter unit configured to filter the received AC power, a first rectifier configured to rectify an AC power filtered in the AC filter unit, a transformer configured to transform an output voltage of the first rectifier, a second rectifier configured to rectify an output voltage of the transformer, a control unit configured to selectively supply an output voltage of the first rectifier to a first winding of the transformer in response to an output voltage of the second rectifier, and a photo coupler configured to provide a signal corresponding to an output voltage of the second rectifier to the control unit.

The AC/DC converter may further include a relay part which selectively transfers the input AC power to the first rectifier.

The power supply device may further include a feedback control unit configured to vary a size of current provided to the photo coupler according to an operation state of the apparatus and provide the varied current.

The feedback control unit may, in a normal state, provide current to the photo coupler using a first resistance, and in a standby state, provide current to the photo coupler using a second resistance which is larger than the first resistance.

An image forming apparatus according to an embodiment of the present disclosure includes a power supply configured to selectively supply power to the image forming apparatus according to an operation state of the image forming apparatus, a communicator configured to receive print data, an image former configured to print the received print data, and a processor configured to, in response to receiving print data via the communicator, control the image former to print the received print data, wherein the power supply supplies power to an DC/DC converter which is operated according to an enable signal in a standby state and a soft switch, and supplies power to the communicator, the image former and the processor by providing an enable signal to the DC/DC converter according to a turn-on operation of the soft switch.

The power supply device may include an AC/DC converter configured to convert an input AC power into a first DC power having a predetermined size, and to output the first DC power, a DC/DC converter configured to convert the first DC power into a second DC power according to an enable signal and output the second DC power, and a switch unit including a soft switch connected to the first DC power at one end, and configured to, in response to the soft switch being turned on, voltage-distribute the first DC power, and to provide the voltage-distributed first DC power to the DC/DC converter as an enable signal.

The switch unit may, even if the soft switch is turned off after the enable signal is provided, maintain the enable signal and provide the enable signal to the DC/DC converter.

The switch unit may include a soft switch connected to the first DC power at one end and configured to selectively output the first DC power according to a user manipulation, a resistor part including a first resistor and a second resistor connected in series, a first switch configured to selectively provide the first DC power to the resistor part according to an operation of the soft switch, a second switch configured to selectively provide the first DC power to the resistor part according to a control signal, and an AND logical device configured to receive a first control signal and a second control signal, and to provide a logical multiplier of the first control signal and the second control signal to the second switch, wherein intermediate nodes of the first resistor and the second resistor may be connected to an enable signal input of the DC/DC converter.

The image forming apparatus may further include a resetting unit configured to operate using the second DC power, and to, in response to receiving the DC power, output a reset signal to a second control signal, wherein the processor may be booted by a reset signal of the resetting unit and the second DC power and may provide a first signal corresponding to an operation state of the apparatus to the AND logical device.

The processor may determine an operation state of the apparatus, and in response to the determined operation state being a standby state, output a first control signal of a low value.

The power supply may further include a second battery unit configured to supply a charged power to the processor, the resetting unit and the soft switch, wherein the processor controls the AC/DC converter to selectively output a first DC power according to a power charging state of the second battery unit.

Advantageous Effects

As described above, when no printing operation is performed, the image forming apparatus 100 according to this embodiment has a standby state with low power consumption, and thus power consumption within the image forming apparatus 100 can be reduced. The image forming apparatus 100 has a soft switch which has a sensing circuit that does not consume power in a standby state, and thus low power consumption can be achieved in a standby state.

DESCRIPTION OF DRAWINGS

The above and other aspects of one or more exemplary embodiments will become more apparent by reference to specific embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which:

FIG. 1 is a block diagram illustrating a brief configuration of an image forming apparatus, according to an embodiment;

FIG. 2 is a block diagram illustrating a detailed configuration of an image forming apparatus, according to an embodiment of the present disclosure;

FIG. 3 is a diagram of the image former of FIG. 2, according to an embodiment;

FIG. 4 is a diagram of the power supply of FIG. 1, according to an embodiment;

FIG. 5 is a circuit diagram of a power supply according to a first embodiment;

FIG. 6 is a waveform diagram of an operation of a power supply according to the first embodiment;

FIG. 7 is a circuit diagram of a power supply according to a second embodiment;

FIG. 8 is a circuit diagram of a power supply according to a third embodiment;

FIG. 9 is a circuit diagram of a power supply according to a fourth embodiment; and FIG. 10 is a flowchart of an operation of the power supply according to the first embodiment.

MODE FOR INVENTION

Certain exemplary embodiments will now be described in greater detail with reference to the accompanying drawings. The example embodiments may be implemented as various different forms, and is not limited to the example embodiments described herein. To more clearly explain the features of embodiments, the detailed description regarding a well-known feature in the art to which the below embodiments pertain will be omitted.

Throughout the exemplary embodiments, it is to be understood that when one element is referred to as being "connected to", it may be connected directly to or be connected to or coupled to another element, having the other element intervening therebetween. In the case where a part "includes" or "comprises" an element, it may be interpreted as, unless otherwise specified, further including another element, not excluding the other element.

Throughout the present disclosure, an "image forming job" may refer to various operations associated with the formation of an image, the creation/storing/transmission of an image file, or the like (e.g. printing, scanning, sending facsimile), and a "job" may not only refer to an image forming job but also include a serious of processes required for performing an image forming job.

An "image forming apparatus" refers to an apparatus which prints print data generated in a terminal such as a computer in a printing paper. Examples of the image forming apparatus may include a copy machine, a printer, a facsimile, or a multi-function peripheral (MFP) in which the above functions are combined and implemented on one apparatus. The image forming apparatus may refer to all apparatuses capable of performing an image forming job, such as a printer, a scanner, a fax machine, a MFP, a display apparatus, or the like.

A "hard copy" refers to an operation of outputting an image onto a printable medium such as paper or the like, and a "soft copy" refers to an operation of outputting an image onto a display apparatus such as a TV, a monitor, or the like.

A "content" may refer to all types of data subject to an image forming job, such as a photo, an image, a document file, or the like.

A "print data" may refer to data which is converted into a format that is printable in a printer. When the printer supports the direct printing, the printing data may be files themselves.

A "user" may refer to a person who performs a manipulation associated with an image forming job using an image forming apparatus, or a device connected to an image forming apparatus via cable or wirelessly. An "administrator" may refer to a person who has the authority to access all functions and system of an image forming apparatus. The "administrator" and the "user" may be the same person.

FIG. 1 is a block diagram illustrating a simple constitution of an image forming apparatus according to an embodiment.

Referring to FIG. 1, the image forming apparatus 100 includes a communicator 110, a processor 120, an image former 130 and a power supply 200.

The communicator 110 may be connected to a terminal (not shown) such as a mobile device (e.g. smart phone, tablet PC), a PC, notebook PC, a personal digital assistant (PDA), a digital camera, or the like, and may receive files and print data from the terminal (not shown). Specifically, the communicator 110 may be provided to connect the image forming apparatus 100 to an external device through not only LAN (Local Area Network) and the Internet but also a USB (Universal Serial Bus) port or wireless communication (e.g. WiFi 802, 11 a/b/g/n, NFC, Bluetooth).

The image former 130 may print print data. The image former 130 may form an image on a recordable medium using various printing methods, such as an electronic photo method, an inkjet method, a thermal transfer method, an thermal method, or the like. For example, the image former 130 may print an image onto a recordable medium by a series of processes including a light exposure, development, transcription and fixing unit. The detailed configuration of the image former 130 will be described below with reference to FIG. 3.

The processor 120 may control each unit within the image forming apparatus 100. Specifically, the processor 120 may be implemented as a CPU, an application-specific integrated circuit (ASIC), etc., and determine an operation state of the image forming apparatus 100.

For example, when a soft switch is depressed or print data is received via the communicator 110, the image forming apparatus 100 may determine that the operation state is changed from a standby state (or power-saving state) to a normal state. More specifically, when a soft switch is depressed in a standby state and a reset signal is received in the processor 120 and an initial booting operation is performed, the processor 120 may determine that the operation state is changed to a normal state.

Meanwhile, when the processor has the circuit configuration in which power is supplied even in a standby state, the processor 120 may determine that it is necessary to convert the operation state into a normal state according to detection of a depressed state of a soft switch and whether print data is received.

When print data is received, the processor 120 may perform processing such as parsing the received print data, etc. to generate binary data, and control the image former 130 to print the generated binary data.

When the printing job is complete and a predetermined time elapses, the processor 120 may determine that the operation state of the image forming apparatus 100 is a standby state. In addition, the processor 120 may control the power supply 200 to supply power corresponding to a standby state. Here, the standby state refers to a state where the power supply 200, which will be described below, does not output a second DC power. For convenience of explanation, the embodiments describe only a case in which the image forming apparatus 100 has a normal state or a standby state, but the image forming apparatus 100 may have further divided operation states.

The power supply 200 may selectively supply power to the image forming apparatus 100 according to an operation state of the image forming apparatus 100. Specifically, the power supply unit 200 may supply power to a DC/DC converter which is operated according to an enable signal in a standby state and a soft switch, and supply power to each unit within the image forming apparatus 100 by providing an enable signal to the DC/DC converter according to a turn-on operation of the soft switch. The detailed configuration and operation of the power supply 200 will be described below with reference to FIG. 4.

As described above, when no printing operation is performed, the image forming apparatus 100 according to this embodiment has a standby state with low power consumption, and thus power consumption within the image forming apparatus 100 can be reduced. The image forming apparatus 100 has a soft switch which has a sensing circuit that does not consume power in a standby state, and thus low power consumption can be achieved in a standby state.

Although only simple components constituting an image forming apparatus have been illustrated and described thus far, various components may be further included in the image forming apparatus in some embodiments. This will be described below with reference to FIG. 2.

FIG. 2 is a block diagram illustrating a detailed configuration of an image forming apparatus, according to an embodiment of the present disclosure.

Referring to FIG. 2, the image forming apparatus 100 includes a communicator 110, a processor 120, an image former 130, a display 140, an operation input interface 150, a storage 160 and a power supply 200.

The communicator 110, the image former 120 and the processor 130 are the same as the constitution illustrated in FIG. 1, which will not be redundantly explained below for the purpose of brevity.

The display 140 displays various information provided from the image forming apparatus 100. Specifically, the display 140 may display a user interface window for receiving selection of various functions provided by the image forming apparatus 100. The display 140 may be a monitor, such as a Liquid Crystal Display (LCD), a Cathode-Ray Tube (CRT), an Organic Light-Emitting Diode (OLED), and/or the like, and may also be implemented as a touch screen capable of simultaneously performing the function of the operation input interface 150, which will be described below.

In addition, the display 140 may display a control menu for performing functions of the image forming apparatus 100.

The operation input interface 150 may receive selection of function and a control command with respect to the corresponding function from a user. Here, the function may include a print function, a copy function, a scan function, a fax sending function, etc. The operation input interface 150 may receive them through a control menu displayed on the display 140.

The operation input interface 150 may be configured by an input such as a plurality of buttons, a keyboard, a mouse, or the like, or may be configured as a touch screen which is capable of simultaneously performing above-mentioned functions of the display 140.

In addition, the operation input interface 150 may include a power button which varies an operation state of the image forming apparatus 100, and the power button may be implemented as the aforementioned soft switch. According to such operation of the power button, the image forming apparatus 100 may be changed from a normal state to a power-saving state and from a power-saving to a normal state.

The storage 160 may store the printing data received through the communicator 110. The storage 160 may be configured as a storage medium inside the image forming apparatus 100, or an external storage medium, for example, a removable disk, such as a USB memory, a storage medium connected to a host device, or a web server connected to a network.

While it has been illustrated and described with reference to FIGS. 1 and 2 that the power supply 200 is included in the image forming apparatus 100, the power supply 200 may be implemented as a separate apparatus in some embodiments. In this case, the above-mentioned power supply 200 may be referred to as a power supply device, and may also be applied to any electronic apparatus requiring conversion from a power-saving state to a normal state according to a manipulation of buttons.

Although a general function of the image forming apparatus 100 has been shown and described with reference to FIGS. 1 and 2, in addition to the aforementioned constitution, the image forming apparatus 100 may further include a scanner which performs a scan function, a fax transmitter and receiver which performs a fax transmitting and receiving function, etc. according to a function supported by the image forming apparatus 100.

FIG. 3 is a diagram of the image former of FIG. 2, according to an embodiment;

Referring to FIG. 3, the image former 130 may include an Organic Photo Conductor (OPC) 131, a charger 132, an exposer 133, a developer 134, a transcriber 135, and a fixing unit 138.

The image former 130 may further include a feeding means (not shown) which feeds a recording medium (P). An electrostatic latent image is formed on the OPC 131. The OPC 131 may be referred to as an OPC drum, an OPC belt, etc. according to the shape of the OPC.

The charger 132 charges a surface of the OPC 131 with uniform potential. The charger 132 may be implemented in the form of a corona charger, a charging roller, a charging brush, etc.

The exposer 133 may change a surface potential of the OPC 131 according to information on an image to be printed, thereby forming an electrostatic latent image on the surface of the OPC 131. For example, the exposer 133 may irradiate light that has been modulated according to the information on the image to be printed onto the OPC 131 to form an electrostatic latent image. The exposer 133 in this form may be referred to as a laser scanning unit, and an LED may be used as a light source.

The developer 134 receives a developing agent within itself, and supplies the developing agent to the electrostatic latent image to develop a visible image. The developer 134 may include a developing roller 137 which provides a developing agent to an electrostatic latent image. For example, a developing agent may be provided from the developing agent 137 to an electrostatic latent image formed on the OPC 131 by means of a developing field formed between the OPC 131.

A visible image formed on the OPC 131 is irradiated onto a recordable medium (P) by the transcriber 135 or an intermediate transfer belt (not shown). The transcriber 135 may transcribe the visual image to the recordable medium using, for example, an electrophotographic method. The visual image is adhered to the recordable medium (P) using electrostatic attraction.

The fixing unit 138 may apply heat and/or pressure to the visual image on the recordable medium (P) to fix the visual image onto the recordable medium (P). A printing job is completed by the aforementioned series of processes.

The aforementioned developing agent is used every time an image forming job is performed, and is used up when it is used more than a predetermined time. In this case, a unit which stores a developing agent (e.g. developer (134) itself) needs to be replaced with a new one. A component or elements which are replaceable in the process of using an image forming apparatus are referred to as a consumable unit or replaceable unit. In addition, memory (or CRUM chip) may be attached to the consumable unit for proper management of the consumable unit.

FIG. 4 is a diagram of the power supply of FIG. 1, according to an embodiment.

Referring to FIG. 4, the power supply 200 may include an AC/DC converter 300, a DC/DC converter 210 and a switch unit 220.

The AC/DC converter 300 converts AC power input into a first DC power having a predetermined size and outputs the first DC power. In this example, the AC/DC converter 300 may be mounted in an electronic apparatus such as an image forming apparatus 100, and may also be in the form of an adapter. In addition, the AC/DC converter 300 may be configured as a general Switched Mode Power Supply (SMPS). In this example, the first DC power may be a 24V DC power. The detailed configuration and operation of the AC/DC converter 300 will be described below with reference to FIG. 5.

The DC/DC converter 210 receives an enable signal and a first DC power of the AC/DC converter, and in response to the enable signal being applied, converts the first DC power into a second DC power and output the second DC power. In this example, the second DC power may be a 3.3V DC power.

The switch unit 220 includes a soft switch, and provides an enable signal to the DC/DC converter 200 in response to a turn-on operation of the soft switch. In addition, the switch unit 220 may maintain the enable signal to provide the enable signal to the DC/DC converter 210 even if the soft switch is turned off after the enable signal is provided. The switch unit 220 may be configured as a soft switch and a plurality of switch devices, and the detailed configuration and operation of the switch unit 220 will be described below with reference to FIGS. 5 and 6.

FIG. 5 is a circuit diagram of a power supply according to a first embodiment.

Referring to FIG. 5, the power supply 200 may include an AC/DC converter 300, a DC/DC converter 210, a switch unit 220, a micom 230, and a resetting unit 240.

The AC/DC converter 300 converts AC power input into a first DC power having a predetermined size and outputs the first DC power. The AC/DC converter 300 may include an input unit 310, an AC filter unit 320, a first rectifier 330, a transformer 340, a second rectifier 350 and a control unit 360.

The input unit 310 receives AC power. Specifically, the input unit 210 may receive commercial alternating current power (for example, 230V, 50 Hz) in general.

The AC filter unit 320 filters the received AC power. Specifically, the AC filter unit 320 may remove a high frequency signal from the received AC power.

The first rectifier 330 rectifies an output power of the AC filter unit 320. Specifically, the first rectifier 330 may rectify and flattening the output voltage of the AC filter unit 320 by means of a diode and a capacitor and provide the output voltage to the transformer 340.

The transformer 340 has a first winding and a second winding, and transforms an output voltage of the first rectifier 330 applied to the first winding according to a control of the control unit 360 and outputs the second winding.

The second rectifier 350 rectifies an output power of the transformer 340. Specifically, the second rectifier 360 may rectify and flatten a power outputted from the second winding of the transformer by means of a diode and a capacitor, and output a preset first DC power.

The control unit 360 may selectively control power received in the first winding of the transformer 340 using a switch unit such that the AC/DC converter 300 outputs the preset first DC power. The control unit 360 may include a controller 361 and a photo coupler 362.

The controller 361 selectively supplies an output voltage of the first rectifier to the first winding of the transformer 340 in response to an output voltage of the second rectifier 350. Specifically, the controller 361 may control a turn-off operation of a switch device connected to the first winding of the transformer 340 according to a signal provided to the photo coupler 362.

The photo coupler 362 provides a signal corresponding to the output voltage of the second rectifier to the controller 361. Specifically, the photo coupler 362 includes a light diode and a light receiver. The light diode is a device which emits light corresponding to a current provided, and the light receiver receives light emitted from the light diode and provides a signal corresponding to the received light to the controller 361.

While it has been configured in the above-shown example that the AC/DC converter includes the input unit (310), the AC filter unit (320), the first rectifier (330), the transformer (340), the second rectifier (350) and the control unit (360), according to the implementation, some of the aforementioned features may be omitted or substituted, or another different circuit (e.g. PFC circuit) may be added.

The DC/DC converter 210 receives an enable signal and a first DC power of the AC/DC converter, and in response to the enable signal being applied, converts the first DC power into a second DC power and output the second DC power. Although it has been shown in the illustrated example that the DC/DC converter outputs a second DC power outputting 3.3 V, this is merely an example. If power required for the system has a different size, a DC power corresponding to the size may be outputted. In addition, the DC/DC converter 210 may output not only one second DC power but also a plurality of second DC powers having different sizes.

The switch unit 220 may include a soft switch 221, a first resistance 226, a second resistance 227, a third resistance 222, a fourth resistance 223, a first switch 224, a second switch 225, and an AND logical device 228.

The soft switch 221 receives a first DC power from the AC/DC converter 300, and selectively output the first DC power according to a user manipulation. Specifically, the soft switch 221 is connected to the first DC power at one end, and to the third resistance 222 at the other end. The soft switch 221 may be a normal closed type of push switch. In this example, the normal closed type of push switch is turned on only when a user depresses the switch, and maintains a turn-off state when the switch is not depressed.

The resistor 226, 227 includes a first resistance 226 and a second resistance 227 connected in series, and voltage-distributes the first DC power and provides the first DC power to an enable terminal of the DC/DC converter 210.

One end of the first resistance 226 is connected to another end of the first switch 224 (specifically, emitter) and another end of the second switch (225) (specifically, emitter) in common, and the other end of the first resistance 226 is connected to an enable terminal of the DC/DC converter 210 and one end of the second resistance 227 in common.

One end of the second resistance 227 is connected to another end of the first resistance 226 and an enable terminal of the DC/DC converter 210, and the other end of the second resistance 227 is grounded.

The third resistance 222 and the fourth resistance 223 are serially connected, and a first DC power provided from the soft switch 221 is voltage-distributed and provided to the first switch 224. Intermediate nodes of the third resistance 222 and the fourth resistance 223 has a voltage value only in a turn-on state of the soft switch 221, and thus may be used to detect an operation state of the soft switch 221. That is, the intermediate nodes of the third resistance 222 and the fourth resistance 223 may be connected to the micom 230, which will be described below.

One end of the third resistance 222 is connected to another end of the soft switch 221, and another end of the third resistance 222 is connected to one end of the fourth resistance 223 and a control terminal of the first switch 224 (specifically, base) in common.

One end of the fourth resistance 223 is connected to another end of the third resistance 222 and a control terminal of the first switch 224 in common, and another end of the fourth resistance 223 is grounded.

The first switch 224 receives a first DC power from the AC/DC converter 300, and selectively provides the first DC power to the resistor 226, 227 according to an operation of the soft switch. In the first switch, a collector may be connected to the first DC power, and a base may be connected to the soft switch 221 via the third resistance 222, and an emitter may be a first transistor connected to one end of the first resistance 226.

The second switch 225 receives a first DC power from the AC/DC converter 300, and selectively output the first DC power to the resistor according to a control signal. In the second switch 225, a collector may be connected to the first DC power, a base may be connected to an output terminal of the AND logical device 228, and an emitter may be a second transistor connected to one end of the first resistance 226.

The AND logical device 228 may receive a first control signal and a second control signal, and provide a logical multiple of the first control signal of the second control signal to the second switch 225. Specifically, the AND logical device 228 may receive the first control signal from the micom 230 and the second control signal from the resetting unit 240, and output a logical multiple of the two control signals to a base of the second switch 225.

The micom 230 controls an operation of the power supply 200. Specifically, the micom 230 is operated by an output voltage of the DC/DC converter 210, and is booted and operated when the output voltage is applied from the DC/DC converter 210 and a reset signal is received from the resetting unit 240.

The booted micom 230 generates a first control signal corresponding to an operation state of the power supply 200 and outputs the first control signal. In this example, the first control signal has a high value when the determined operation state is a normal state, and has a low value when the determined operation state is not a normal state (that is, standby state).

When a button operation of a soft switch is detected in a normal state, the micom 230 may change an operation of the power supply to a standby state. When the micom 230, when cannot be immediately converted into a standby state (e.g. when printing is performed), may be converted to a standby state after the corresponding state is completed. The micom 230 may control a first control signal to have a low value.

The micom 230 may be a separate control IC only for controlling a power supply, and may also be the processor 120 of FIGS. 1 and 2.

The resetting unit 240 generates and outputs a reset signal when an output voltage is applied from the DC/DC converter 210. When a plurality of control devices are present within the image forming apparatus 100, the resetting unit 240 may apply the reset signal to each of the plurality of control devices. In this example, the resetting unit 240 may sequentially provide the reset signal to a plurality of control devices according to a predetermined order so as to prevent significant voltage drop in the DC/DC converter 210.

Hereinafter, a power state in a standby state will be described based on the aforementioned circuit configuration.

First, in a standby state, the AC/DC converter 300 outputs a first DC power using an external AC. The outputted first DC power is provided to the soft switch 221, the first switch 224, the second switch 225 and the DC/DC converter 210.

However, an enable signal is not received in the DC/DC converter 210 and thus the DC/DC 210 is not operated. Also, the soft switch 221, the first switch 224 and the second switch are in a turn-off state and thus no power is consumed by the switches and resistances 222, 223, 226, 227 connected thereto. That is, according to the embodiment, no power is consumed in the switch unit 220 of the power supply 200 in a standby state.

The case where a soft switch is operated in the above-mentioned state will be described below with reference to FIG. 6 together with FIG. 5.

When the soft switch is in a turn-on state, the first DC power is transferred to the third resistance 222 and the fourth resistance 223 and accordingly, the first switch 224 is turned on.

According to the turn-on operation of the first switch 224, an electric current flows through the first resistance 226 and the second resistance 227, and the first DC power which is voltage-distributed by the first resistance 226 and the second resistance 227 is input to the DC/DC converter 210 as an enable signal.

The DC/DC converter 210 which receives an enable signal generates a second DC power using the first DC power provided from the AC/DC converter 300, and provides the generated second DC power to the micom 230 and the resetting unit 240.

The resetting unit 240 which receives the second DC power generates a reset signal and provide the reset signal to the micom 230 and the AND logical device 228.

The micom 230 which receives the second DC power and the reset signal is operated and provides the first control signal to the AND logical device 228.

The signals received in the two input terminals of the AND logical device 228 which receives the reset signal and the first control signal have a high value and thus, a logical signal (or control signal) of a high value is provided to the second switch 225.

The second switch 225 which receives a control signal having a high value is turned on.

Accordingly, in the state that the second switch 225 is turned on, even if the soft switch 221 is turned off, an enable signal is continuously received in the DC/DC converter 210 through a current path leading from the second switch 225, the first resistance 226 to the second resistance 227.

An operation where a soft switch is operated in the above-mentioned normal state will be described below.

Meanwhile, the micom 230 may determine that the power supply is converted into a power-saving state, or may, when it is detected that a soft switch is depressed (specifically, it is detected that a voltage is generated in an intermediate node between the third resistance and the fourth resistance) control the first control signal to have a low value.

Accordingly, one of the input terminals of the AND logical device 228 has a low value and thus, an output value is converted to a low value and accordingly, the second switch 225 is turned off. Accordingly, an enable signal is not received in the DC/DC converter 210 and thus, the DC/DC converter 210 stops outputting the second DC power and the power supply 200 enters a standby state.

At the time of the implementation, the micom 230 may, rather than changing a state of the first control signal immediately after detecting depression of a soft switch, determine whether the soft switch has been depressed for more than a predetermined time, and if yes, vary a state of the first control signal, so as not to immediately react when a user mistakenly depresses the soft switch. Here, a predetermined time may be in the range of two seconds to five seconds.

The power supply according to the embodiment may detect a manipulation of the soft switch in a standby state. A circuit configuration which detects the above-mentioned switch manipulation does not consume power in a standby state, and thereby power consumption of 0.1 W may be easily achieved.

Although it has been described with reference to FIG. 5 that the first switch and the second switch are implemented as bipolar junction transistors (BJT), at the time of the implementation, they may be implemented as a metal-oxide semiconductor field-effect-transistor (MOSFET)-type switch devices.

FIG. 7 is a circuit diagram of a power supply according to a second embodiment; According to the second embodiment, the power supply 200' may reduce power consumption of the AC/DC converter 300 in a standby state.

Referring to FIG. 7, the power supply 200' may include an AC/DC converter 300', a DC/DC converter 210, a switch unit 220, a micom 230, a resetting unit 240 and a second battery unit 250.

The AC/DC converter 300' converts AC power input into a first DC power having a predetermined size and outputs the first DC power. The AC/DC converter 300' may include an input unit 310, an AC filter unit 320, a first rectifier 330, a transformer 340, a second rectifier 350, a control unit 360 and a relay 370.

The input unit 310, the AC filter unit 320, the first rectifier 330, the transformer 340, the second rectifier 350 and the control unit 360 are the same as the constitution illustrated in FIG. 5, which will not be redundantly explained below for the purpose of brevity.

The relay 370 is a device which selectively supplies an external AC power to the AC/DC converter 300'. Specifically, the relay 370 is selectively turned on or turned off according to a control of the micom 230. If the relay 370 is in a turn-on state, the AC/DC converter 300' performs the same operation as the AC/DC converter 300 of FIG. 5.

If the relay 370 is in a turn-off state, an external AC power is not transferred to a device within the AC/DC converter 300' and thus, no power is consumed within the AC/DC converter 300'.

The DC/DC converter 210 and the switch unit 220 are the same as the operation illustrated in FIG. 5, which will not be redundantly explained below for the purpose of brevity.

The second battery unit 250 includes a second battery, and when the power supply 200' is in a normal state, charges the second battery using the first DC power outputted from the AC/DC converter 300.

In addition, when the power supply 200' is in a standby state, the second battery unit 250 may provide power charged in the second battery to a feature of the power supply 200'. For example, the power supply 200' may provide power charged in the second battery to the soft switch unit 220, the micom 230 and the resetting unit 240.

As such, power is supplied to the micom 230 in a standby mode as well and thus, it is possible to immediately convert an operation mode in response to print data transferred from an external apparatus. In addition, the power supply 200' includes a relay which blocks power consumed in the AC/DC converter 300 in a standby mode, and thereby power consumption in a standby mode may be further reduced.

According to the second embodiment, in the case where there is no power supply from the AC/DC converter, power is supplied to a device such as a micom or the like, only using power charged in the second battery, and thereby power charged in the second battery is gradually decreased.

Thus, the micom 230 may monitor a charging state of the second battery 250, and in response to the charging state of the second battery 250 being less than a predetermined state, turn on the relay 370 to charge the second battery. According to a turn-on operation of the relay 370, the AC/DC converter may output a preset first DC power, and the second battery unit 250 may charge the second battery according to the outputted first DC power.

In addition, the micom 230, when the second battery 250 is in a full-charged state or is more than a preset power state, turns off the relay 370 so that the AC/DC converter 300 is not operated. Accordingly, the power supply 200' is not using an external power.

As described above, according to the second embodiment, the power supply stops an operation of the AC/DC converter in a standby state, thereby further reducing power consumption in a standby mode.

FIG. 8 is a circuit diagram of a power supply according to a third embodiment; According to the third embodiment, the power supply may reduce power consumption of the AC/DC converter 300 in a standby mode.

Referring to FIG. 8, the power supply 200" may include an AC/DC converter 300", a DC/DC converter 210, a switch unit 220, a micom 230 and a resetting unit 240.

The configuration of the DC/DC converter 210, the switch unit 220, the micom 230 and the resetting unit 240 are the same as the constitution illustrated in FIG. 5, which will not be redundantly explained below for the purpose of brevity.

The AC/DC converter 300" converts AC power input into a first DC power having a predetermined size and outputs the first DC power. The AC/DC converter 300" may include an input unit 310, an AC filter unit 320, a first rectifier 330, a transformer 340, a second rectifier 350, a control unit 360 and a feedback controller 370.

The input unit 310, the AC filter unit 320, the first rectifier 330, the transformer 340, the second rectifier 350 and the control unit 360 are the same as the constitution illustrated in FIG. 5, which will not be redundantly explained below for the purpose of brevity.

The feedback controller 370 varies current provided from a photo coupler 362 according to an operation state of the power supply 200, and provides the current. For example, the feedback controller 370 may provide current to the photo coupler using a first resistance in a normal state, and provide current to the photo coupler 362 using a second resistance which is greater than the first resistance in a standby state.

The feedback controller 370 includes a third switch 381 and a fourth switch 383 which are turned on in an operating mode to operate and a fifth switch 382 which is turned on in a standby mode to operate.

The third switch 381 and the fourth switch 383 are turned on in an operating mode, and thereby an output power of the second rectifier is provided to a photodiode of the photo coupler 371 via a resistance connected to a lower end of the third switch 381. Such configuration is the same as the circuit configuration of the photo coupler 362 in general, which will not be redundantly explained below for the purpose of brevity.

The fifth switch 382 is turned on in a standby mode, and thereby an output power of the second rectifier is provided to a photodiode of the photo coupler 371 via a resistance connected to a lower end of the second switch 382. The resistance connected to the lower end of the second switch 382 is larger than the resistances connected to the third switch and the fourth switch, and a relatively larger resistance is used. Thereby, current provided to the photodiode is reduced. Accordingly, power consumption in a standby mode may further reduced.

The use of a large resistance increases a feedback time constant of a system, and thereby, a reaction speed of the system is decreased. Unlike the operating state, fast reaction is unnecessary in a standby state and thus, the increased time constant does not degrade system performance. In other words, a time constant is increased in a standby mode which does not degrade the system, and thereby power consumption of a power feedback circuit may be reduced.

As described above, the power supply according to the third embodiment may further reduce power consumption in a feedback circuit of an output voltage in a standby state.

FIG. 9 is a circuit diagram of a power supply according to a fourth embodiment. Specifically, the power supply 200''' according to the fourth embodiment only differs in circuit configuration from the feedback controller 370 of the third embodiment.

Referring to FIG. 9, the features other than a circuit configuration of the feedback controller 370' are the same as the constitutions of FIG. 8 and thus, only the circuit configuration of the feedback controller 370' will be described below.

Compared with the feedback controller 370 of FIG. 8, the second switch 382 is omitted in the feedback controller 370'.

Accordingly, in a standby mode, the third switch 381 and the fourth switch 383 are turned off, that is, current flows only in a resistor element on the right and the operation is the same as that of FIG. 8.

In an operating mode, the third switch 381 and the fourth switch 383 are turned on, and unlike FIG. 8, current flows in both a resistor element on the left and a resistor element on the right. However, resistances connected in parallel have a low resistance and thus, current is provided to the photo coupler through a resistance lower than that of standby mode.

In other words, the feedback controller 370' of FIG. 9 provides different currents to the photocoupler according to an operation state as well, thereby further reducing power consumption in a standby mode.

FIG. 10 is a flowchart of an operation of the power supply according to the first embodiment.

First, the operation of FIG. 10 is based on the embodiment of FIG. 7, that is, the relay is turned off in a standby state where the AC/DC converter is not outputting a preset first power.

First, the power supply detects a charging state of a second battery at operation S1010. Here, a micom is being operated using power of the second battery.

The power supply determines whether a charging state of the second battery is less than a preset capacity, at operation S1020.

As a result of determination, if the charging state of the second battery is less than the preset capacity, S1020-Y, the power supply operates the relay to control the AC/DC converter to output power, at operation S1030. Thereby, the second battery is charged using the power outputted from the AC/DC converter.

Upon charging, the power supply continuously monitors a charging state of the second battery, and determines whether the charging state is more than a preset capacity, at operation S1040.

As a result of determination, if the charging state of the second battery is more than the preset capacity, S1040-Y, the micom may control the relay to maintain a turn-off state again, at operation S1050. Thereafter, the above-described process is repeated, and when a print command is received from an external source or a soft switch is operated, the power supply may turn on the relay to be convert into a normal state.

Thereby, a controlling method of a power supply according to the embodiment may stop operation of an AC/DC converter during a standby mode, thereby reducing standby power consumption in the power supply. The controlling method of the power supply as illustrated in FIG. 10 may be executed for the power supply device having the configuration of FIG. 7, and may be executed for a power supply device having a configuration other than the above.

Further, the controlling method described above may be implemented to be at least one program to perform the driving control method, and such implementing program may be stored in non-transitory computer readable recording medium.

The respective blocks of the present disclosure may be implemented as a computer readable code on a computer readable recording medium. The non-transitory computer readable recording medium may be apparatus to store the data that can be read by a computer system.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A power supply device, comprising:
an AC/DC converter to convert an input AC power into a first DC power having a predetermined size, and to output the first DC power;
a DC/DC converter to convert the first DC power into a second DC power; and
a switch including a soft switch and a resistor part, the soft switch connected to the first DC power at a first end of the soft switch and to the resistor part at a second end of the soft switch, and the resistor part, in response to the soft switch being turned on, to voltage-distribute the first DC power to provide the voltage-distributed first DC power to the DC/DC converter as an enable signal in a standby state of an apparatus to cause the DC/DC converter to convert the first DC power into the second DC power.

2. The device as claimed in claim 1, wherein the switch, when the soft switch is turned off after the enable signal is provided, maintains the enable signal and provides the enable signal to the DC/DC converter.

3. The device as claimed in claim 1, wherein,
the soft switch is to selectively output the first DC power according to a user operation of the soft switch to be turned on; and
the switch comprises:
the resistor part including a first resistor and a second resistor connected in series;
a first switch to selectively provide the first DC power to the resistor part according to the operation of the soft switch;
a second switch to selectively provide the first DC power to the resistor part according to a control signal; and
an AND logical device to receive a first control signal and a second control signal, and to provide a logical multiplier of the first control signal and the second control signal as the control signal to the second switch,
wherein an intermediate node between the first resistor and the second resistor is connected to an enable signal input of the DC/DC converter to input the enable signal to the DC/DC converter.

4. The device as claimed in claim 3, wherein the soft switch is a normal closed type of push switch which is turned on only when a push by the user as the user operation of the soft switch is received.

5. The device as claimed in claim 3, wherein the first switch is a first transistor which includes a collector connected to the first DC power, a base connected to another end of the soft switch via resistance, and an emitter connected to one end of the first resistance, and wherein the second switch is a second transistor which includes a collector connected to the first DC power, a base connected to an output of the AND logical device, and an emitter connected to one end of the first resistance.

6. The device as claimed in claim 3, further comprising:
a micom to operate using the second DC power, and to output a first control signal corresponding to an operation state of the apparatus; and
a resetting unit to operate using the second DC power, and to, in response to receiving the DC power, output a reset signal to a second control signal.

7. The device as claimed in claim 6, wherein the micom is to determine an operation state of the apparatus, and to, in response to the determined operation state being the standby state, output a first control signal of a low value.

8. The device as claimed in claim 6, further comprising:
a second battery unit to supply a charged power to the micom, the resetting unit and the soft switch.

9. The device as claimed in claim 8, wherein the micom controls the AC/DC converter to selectively output a first DC power according to a power charging state of the second battery unit.

10. The device as claimed in claim 1, wherein the AC/DC converter comprises:
an input unit to receive an AC power;
an AC filter unit to filter the received AC power;
a first rectifier to rectify an AC power filtered in the AC filter unit;
a transformer to transform an output voltage of the first rectifier;
a second rectifier to rectify an output voltage of the transformer;
a controller to selectively supply an output voltage of the first rectifier to a first winding of the transformer in response to an output voltage of the second rectifier; and
a photo coupler to provide a signal corresponding to an output voltage of the second rectifier to the controller.

11. The device as claimed in claim 10, wherein the AC/DC converter further comprises a relay part which selectively transfers the input AC power to the first rectifier.

12. The device as claimed in claim 10, further comprising:
a feedback controller to vary a size of current provided to the photo coupler according to an operation state of the apparatus and provide the varied current.

13. The device as claimed in claim 12, wherein the feedback controller, in a normal state, provides current to the photo coupler using a first resistance, and in a standby state, provides current to the photo coupler using a second resistance which is larger than the first resistance.

14. An image forming apparatus, comprising:
a power supply to selectively supply power to the image forming apparatus according to a standby state of the image forming apparatus;
a communicator to receive print data;
an image former to print the received print data; and
a processor to, in response to receiving print data via the communicator, control the image former to print the received print data,
wherein the power supply is to,
supply a DC power to a DC/DC converter, and to a soft switch coupled to a resistor part, to cause the soft switch to be operable according to a turn-on operation of the soft switch to transfer the DC power to the resistor part to cause a voltage distribution of the DC power as an enable signal to the DC/DC converter in the standby state, the DC/DC converter operable according to the enable signal provided through the soft switch in the standby state, and
supply power to the communicator, the image former and the processor by providing the enable signal to the DC/DC converter through the soft switch according to the turn-on operation of the soft switch.

15. The apparatus as claimed in claim 14, wherein the power supply comprises:
an AC/DC converter to convert an input AC power into a first DC power having a predetermined size, and to output the first DC power as the DC power to the DC/DC converter;
the DC/DC converter is to convert the first DC power into a second DC power according to the enable signal and output the second DC power to the communicator, the image former and the processor; and
a switch including the soft switch, a first end of the soft switch connected to the first DC power, and a second end of the soft switch connected to the resistor part, and the turn-on operation of the soft switch to cause the voltage distribution of the first DC power.

* * * * *